US007131758B2

(12) United States Patent
Ishida

(10) Patent No.: US 7,131,758 B2
(45) Date of Patent: Nov. 7, 2006

(54) VEHICLE HEADLAMP WITH LIGHT-EMITTING UNIT SHIFTED FROM OPTICAL AXIS OF LENS

(75) Inventor: Hiroyuki Ishida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 73 days.

(21) Appl. No.: 10/827,340

(22) Filed: Apr. 20, 2004

(65) Prior Publication Data

US 2004/0208020 A1 Oct. 21, 2004

(30) Foreign Application Priority Data

Apr. 21, 2003 (JP) .......................... P.2003-116314

(51) Int. Cl.
*F21S 8/10* (2006.01)
*B60Q 1/16* (2006.01)
*F21V 5/04* (2006.01)
*H05B 33/12* (2006.01)

(52) U.S. Cl. ...................... 362/545; 362/244; 362/521; 362/538; 362/800

(58) Field of Classification Search ................ 362/347, 362/539, 545, 244, 521, 538
See application file for complete search history.

(56) References Cited

U.S. PATENT DOCUMENTS 4,949,226 A * 8/1990 Makita et al. .............. 362/538
5,550,716 A * 8/1996 Dassanayake et al. ...... 362/520
6,406,172 B1 * 6/2002 Harbers et al. ............. 362/544
6,926,432 B1 * 8/2005 Rodriguez Barros et al. .... 362/545
6,945,672 B1 * 9/2005 Du et al. .................... 362/545

FOREIGN PATENT DOCUMENTS

| | | | |
|---|---|---|---|
| EP | 1 357 332 | A2 | 10/2003 |
| EP | 1 357 333 | A2 | 10/2003 |
| GB | 2 394 273 | A | 4/2004 |
| JP | 2001-270383 | A | 10/2001 |
| JP | 2003-31011 | A | 1/2003 |
| WO | 02/08015 | A1 | 1/2002 |

* cited by examiner

*Primary Examiner*—Alan Cariaso
(74) *Attorney, Agent, or Firm*—Sughrue Mion, PLLC

(57) ABSTRACT

There are provided five first lighting units for carrying out light irradiation to form a horizontal cutoff line. Each of the first lighting units has such a structure that includes a first light source formed by a light emitting diode provided to face forward in such a manner that one side of a rectangular light emitting chip is extended in a horizontal direction, and first projection lenses provided in front thereof and serving to project the image of the first light source as an inverted image forward from the lighting units. Consequently, the inverted image of the first light source projected forward from the lighting unit is an almost rectangular image having an upper edge extended almost horizontally. These are provided with a shift from each other in the horizontal direction, thereby forming a horizontal cutoff line. Two additional rows of lighting units provide light for an oblique cutoff line and a diffuse light pattern, respectively.

19 Claims, 8 Drawing Sheets

VEHICLE HEADLAMP WITH LIGHT-EMITTING UNIT SHIFTED FROM OPTICAL AXIS OF LENS

This application claims foreign priority based on Japanese Patent application No. 2003-116314, filed Apr. 21, 2003, the contents of which is incorporated herein by reference in its entirety.

BACKGROUND OF THE INVENTION

1. Technical Field

The present invention relates to a vehicle headlamp that forms a light distribution pattern having a horizontal cutoff line on an upper end.

2. Related Art

As described in JP-A-2001-270383, a related art headlamp for a vehicle forms a light distribution pattern having a horizontal cutoff line on an upper end by light irradiation from a plurality of lighting units.

Moreover, JP-A-2003-31011 discloses a linear light source device that forward reflects, through a predetermined reflecting member, a light emitted from a linear light source having a plurality of light emitting diodes arranged straight.

When the linear light source device described in JP '011 is applied to a headlamp for a vehicle, it is possible to form a light distribution pattern having a horizontal cutoff line on an upper end. However, in such a case, there is a related art problem in that it is hard to finely control the shape and luminous intensity distribution of the light distribution pattern.

SUMMARY OF THE INVENTION

In consideration of at least the foregoing, it is an object of the invention to provide a headlamp for a vehicle which forms a light distribution pattern having a horizontal cutoff line on an upper end, wherein the shape and luminous intensity distribution of a light distribution pattern can be finely controlled. However, it is not necessary for the present invention to achieve this object, or any other object.

The present invention forms a horizontal cutoff line by a light irradiation from a plurality of first lighting units using a semiconductor light emitting unit as a light source, and furthermore, devising a method of forming a light distribution pattern by means of each of the first lighting units.

More specifically, the invention provides a headlamp for a vehicle which is constituted to form a light distribution pattern having a horizontal cutoff line on an upper end, comprising:

a plurality of first lighting units for carrying out a light irradiation to form the horizontal cutoff line, each of the first lighting units including a first light source formed by a semiconductor light emitting unit having an almost rectangular light emitting chip and provided to face forward in such a manner that one side of the light emitting chip is extended in a horizontal direction, and a first projection lens provided in front of the first light source and serving to project an image of the first light source as an inverted image forward from the lighting unit.

The "light distribution pattern having a horizontal cutoff line on an upper end" may be a so-called light distribution pattern for a low beam, and may be other light distribution patterns. Moreover, the "light distribution pattern having a horizontal cutoff line on an upper end" may be formed by only a light irradiation from "a plurality of first lighting units" or may be formed by a combination of light irradiations from the other lighting units. In this case, the specific structures of the "other lighting units" are not particularly restricted.

The type of the "semiconductor light emitting unit" is not particularly restricted but a light emitting diode and a laser diode can be employed, for example.

As shown in the structure, the headlamp for a vehicle according to the invention is constituted to form a light distribution pattern having a horizontal cutoff line on an upper end and comprises a plurality of first lighting units for carrying out a light irradiation to form the horizontal cutoff line, and each of the first lighting units includes a first light source formed by a semiconductor light emitting unit having an almost rectangular light emitting chip and provided to face forward in such a manner that one side of the light emitting chip is extended in a horizontal direction, and a first projection lens provided in front of the first light source and serving to project an image of the first light source as an inverted image forward from the lighting unit. Therefore, it is possible to obtain at least the following functions and advantages.

More specifically, each of the first light sources is provided to face forward in such a manner that one side of the light emitting chip is extended in the horizontal direction. Therefore, the inverted image of the first light source which is projected onto a virtual vertical screen provided in front of the lighting unit through the first projection lens becomes an almost rectangular image having an upper edge extended almost horizontally. If the almost rectangular inverted images are disposed with a proper shift from each other in the horizontal direction or are diffused in the horizontal direction to form the horizontal cutoff line, accordingly, a clear horizontal cutoff line can be obtained. Consequently, it is possible to effectively suppress the generation of glare.

In that case, the focal length of each of the first projection lenses can also be set to have a proper different value. Consequently, the size of the inverted image of the first light source can be changed properly. Thus, it is possible to optionally set the luminous intensity distribution of the light distribution pattern in the vicinity of the horizontal cutoff line.

According to the invention, thus, it is possible to finely control the shape and luminous intensity distribution of a light distribution pattern in the headlamp for a vehicle which is constituted to form a light distribution pattern having a horizontal cutoff line on an upper end.

In addition, the headlamp for a vehicle according to the invention has such a structure as to comprise a plurality of first lighting units using a semiconductor light emitting unit as a light source. Therefore, it is possible to reduce the size of each of the first lighting units. Consequently, the degree of freedom of the shape of the headlamp for a vehicle can be enhanced, and furthermore, a size thereof can be reduced.

In the structure, if a shape of the light emitting chip of the first light source is set to be an almost rectangle which is extended to be relatively long in a horizontal direction, an inverted image thereof can also be projected as an oblong image. Consequently, the first lighting unit can be much more suitable for forming the horizontal cutoff line.

In the structure, if there is provided a plurality of second lighting units for carrying out a light irradiation to form an oblique cutoff line which rises from the horizontal cutoff line at a predetermined angle, each of the second lighting units including a second light source formed by a semiconductor light emitting unit having an almost rectangular light emitting chip and provided to face forward in such a manner that one side of the light emitting chip is extended in an inclined direction at the predetermined angle with respect to a horizontal direction, and a second projection lens provided in front of the second light source and serving to project an image of the second light source as an inverted image forward from the lighting unit, it is possible to obtain at least the following functions and advantages.

More specifically, each of the second light sources is provided forward in such a manner that one side of the light emitting chip is extended in the inclined direction at the predetermined angle with respect to the horizontal direction. Therefore, the inverted image of the second light source projected onto a virtual vertical screen provided in front of the lighting unit through the second projection lens becomes an almost rectangular image having an upper edge extended in the inclined direction at the predetermined angle with respect to the horizontal direction.

If the almost rectangular inverted images are disposed with a proper shift from each other in the inclined direction or are diffused in the inclined direction to form an oblique cutoff line, accordingly, a clear oblique cutoff line can be obtained. Consequently, it is possible to effectively suppress the generation of a glare. In that case, the focal length of each of the second projection lenses can also be set to have a proper different value. Consequently, the size of the inverted image of the second light source can be changed properly. Thus, it is possible to optionally set the luminous intensity distribution of the light distribution pattern in the vicinity of the oblique cutoff line.

The specific value of the "predetermined angle" is not particularly restricted but it can be set to be 15 degrees, 30 degrees or 45 degrees, for example but not by way of limitation.

In this case, if the shape of the light emitting chip of the second light source is set to be an almost rectangle which is extended to be relatively long in the inclined direction, the inverted image thereof can also be projected as a long image in the inclined direction. Consequently, the second lighting unit can be much more suitable for forming the oblique cutoff line.

The formation of the horizontal cutoff line can be carried out without using the first lighting units having the first light sources and the first projection lenses, and the second lighting units having the second light sources and the second projection lenses can also be used only for the formation of the oblique cutoff line.

DETAILED DESCRIPTION OF THE INVENTION

An exemplary, non-limiting embodiment of the present invention will be described below with reference to the drawings.

Figure 1:
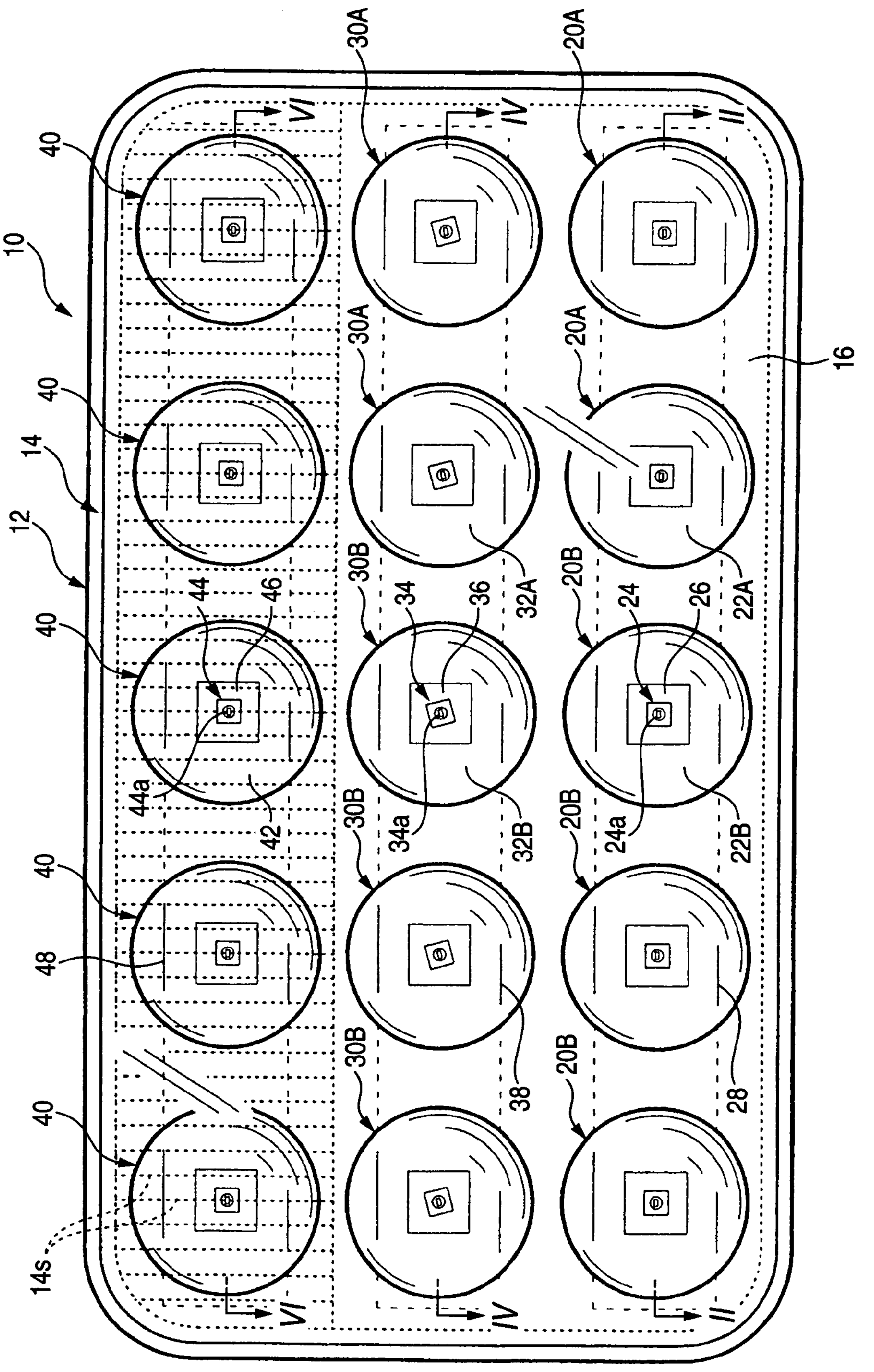
FIG. 1 is a front view showing a headlamp for a vehicle according to an exemplary, non-limiting embodiment of the present invention.

FIG. 1 is a front view showing a headlamp for a vehicle according to the exemplary, non-limiting embodiment of the invention. A headlamp 10 has such a structure that 15 lighting units are accommodated in three upper and lower stages in a lamp housing formed by a lamp body 12 an a translucent cover 14 attached to an opening portion on a front end thereof. More specifically, five first lighting units 20A and 20B are provided in a lower stage, five second lighting units 30A and 30B are provided in a middle stage, and five third lighting units 40 are provided in an upper stage. While an exemplary number of 15 lighting units is provided, the present invention is not limited thereto, and other numbers of lighting units and stages may be provided.

The translucent cover 14 has most of its regions formed to be transparent, and an upper region thereof is provided with a plurality of diffusing lens units 14*s* to be vertically striped to diffuse a light irradiated from the five third lighting units 40 positioned in the upper stage in a horizontal direction. A unit holder 16 is provided behind the translucent cover 14 to surround the 15 lighting units.

Figure 2:
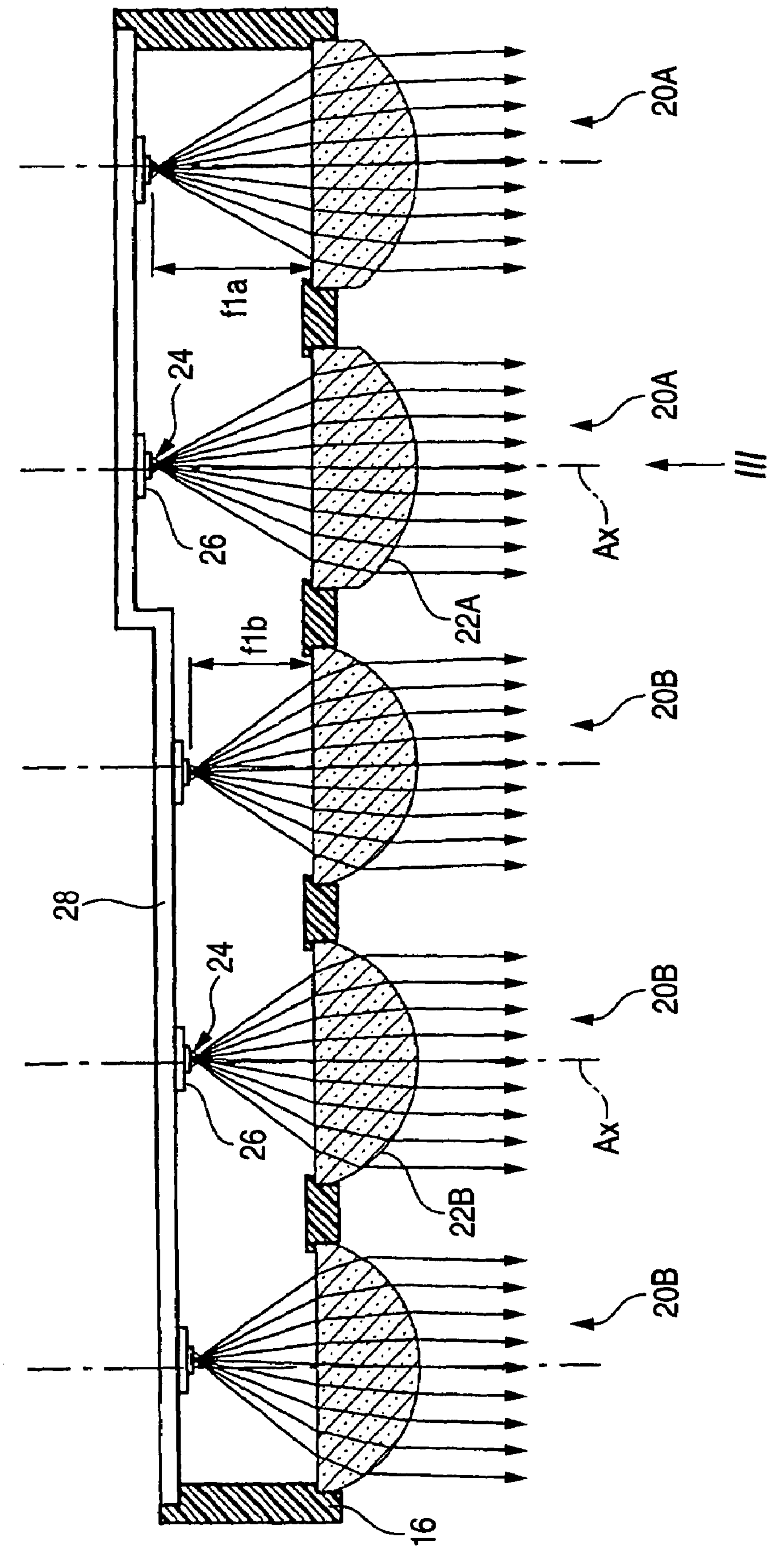
FIG. 2 is a sectional view taken along the II—II line in FIG. 1 according to the exemplary, non-limiting embodiment of the present invention.
Figure 3:
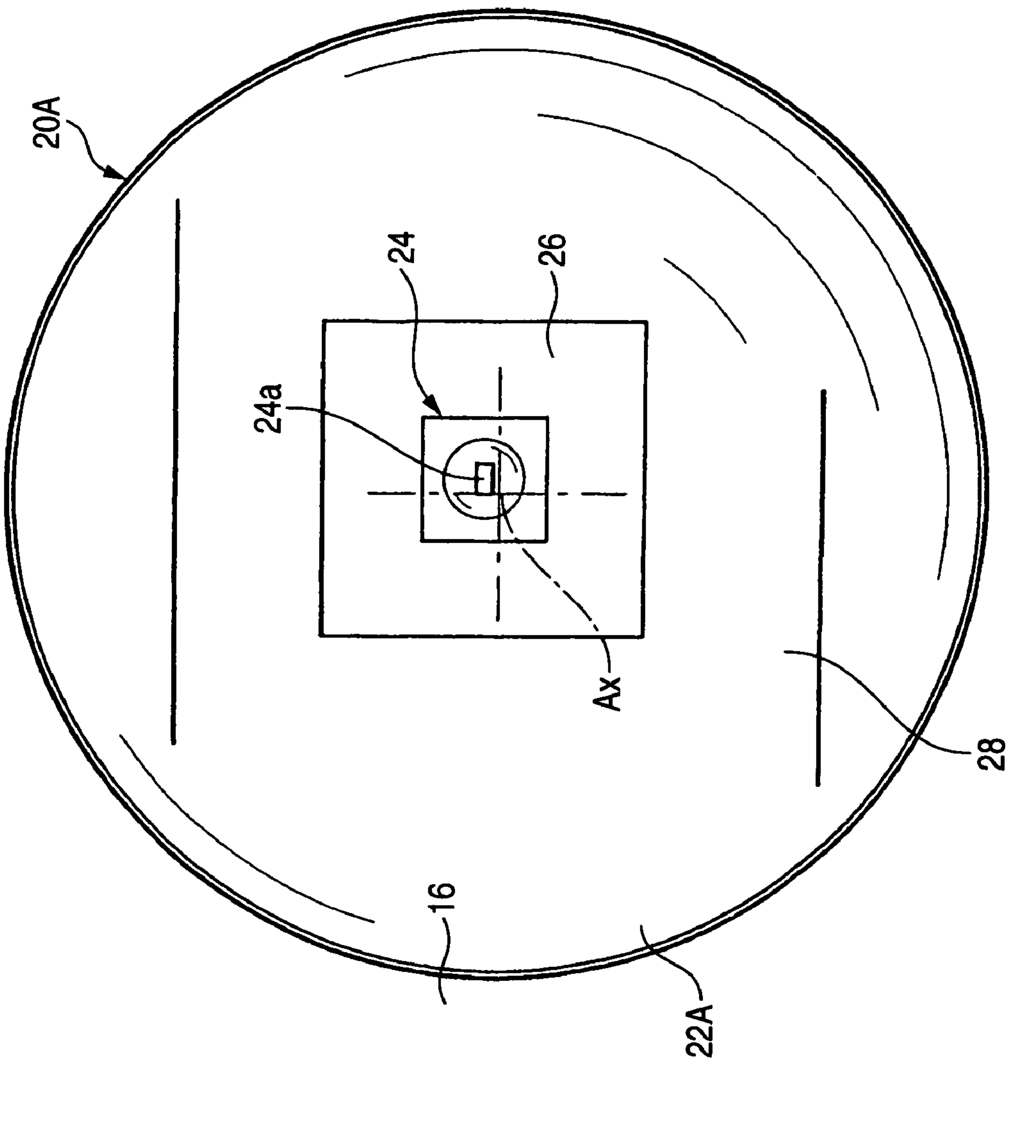
FIG. 3 is a detailed view seen in the III direction of FIG. 2 according to the exemplary, non-limiting embodiment of the present invention.

FIG. 2 is a sectional view taken along a II—II line in FIG. 1 and FIG. 3 is a detailed view seen in a III direction of FIG. 2. All of the five first lighting units 20A and 20B positioned in the lower stage include first projection lenses 22A and 22B provided on an optical axis Ax extended in the longitudinal direction of a vehicle. A first light source 24 formed by a light emitting diode is provided to face forward in the vicinity of a focal point position on the rear side of the first projection lenses 22A and 22B, and a board 26 to which the first light source 24 is attached. The first lighting units 20A and 20B project the image of the first light source 24 as an inverted image forward from the lighting unit by means of the first projection lenses 22A and 22B.

These first lighting units 20A and 20B have the first projection lenses 22A and 22B supported on the unit holder 16, and have the first light source 24 supported on a common holder plate 28 through the board 26. The holder plate 28 is formed to be extended like a band in a transverse direction and is supported on the unit holder 16 at a peripheral edge portion thereof.

The first projection lenses 22A and 22B of the first lighting units 20A and 20B are constituted by a plano-convex lens having a front side surface to be convex and a rear side surface to be flat. In that case, a focal length f1*a* of the first projection lens 22A has a comparatively greater value in the two first lighting units 20A and a focal length f1*b* of the first projection lens 22B has a comparatively smaller value in the three residual first lighting units 20B. The first light sources 24 of the first lighting units 20A and 20B are provided in slightly shifted positions from the optical axis Ax over a focal plane at the rear side of the first projection lenses 22A and 22B.

In FIG. 3 showing one of the first lighting units 20A, the first light source 24 of each of the first lighting units 20A and 20B has a rectangular light emitting chip 24*a* and both upper and lower sides of the light emitting chip 24*a* are provided to be extended in a horizontal direction. The specific shape of the light emitting chip 24*a* is set to be a rectangle that is extended to be relatively long in the horizontal direction.

In the first lighting unit 20A shown in FIG. 3, the first light source 24 is provided in a position shifted rightward and upward from the optical axis Ax as seen from the front of the lighting unit 20A. The first light sources 24 of the residual first lighting units 20A and 20B are also provided in positions shifted upward from the optical axis Ax, and the amount of the shift in the horizontal direction is different for each of the first lighting units 20A and 20B. Consequently, a light irradiated from each of the first lighting units 20A and 20B is set to be a slightly downward parallel light. Furthermore, the direction of the irradiated light is delicately varied between the first lighting units 20A and 20B in the horizontal direction.

Figure 4:
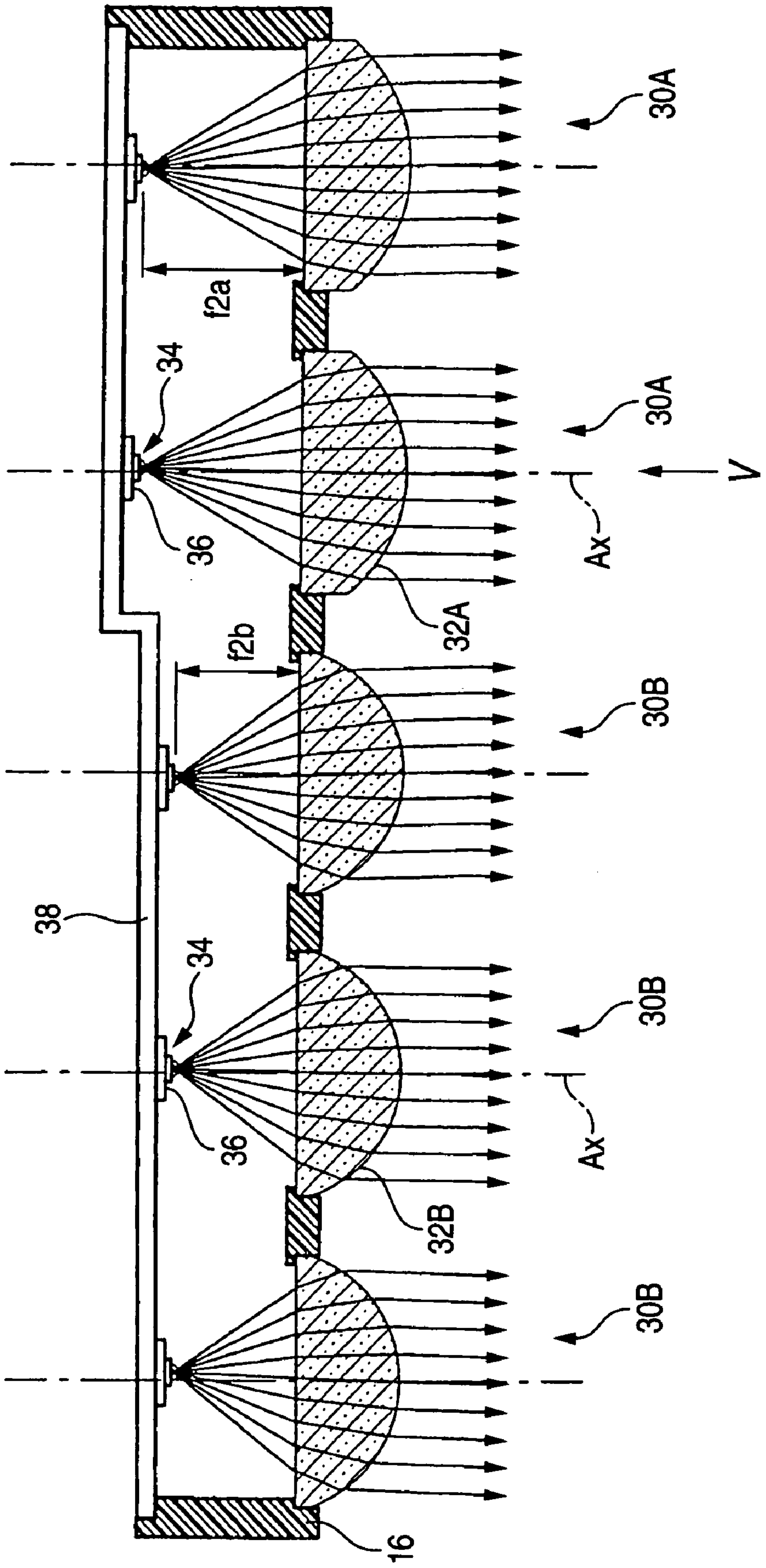
FIG. 4 is a sectional view taken along the IV—IV line in FIG. 1 according to the exemplary, non-limiting embodiment of the present invention.
Figure 5:
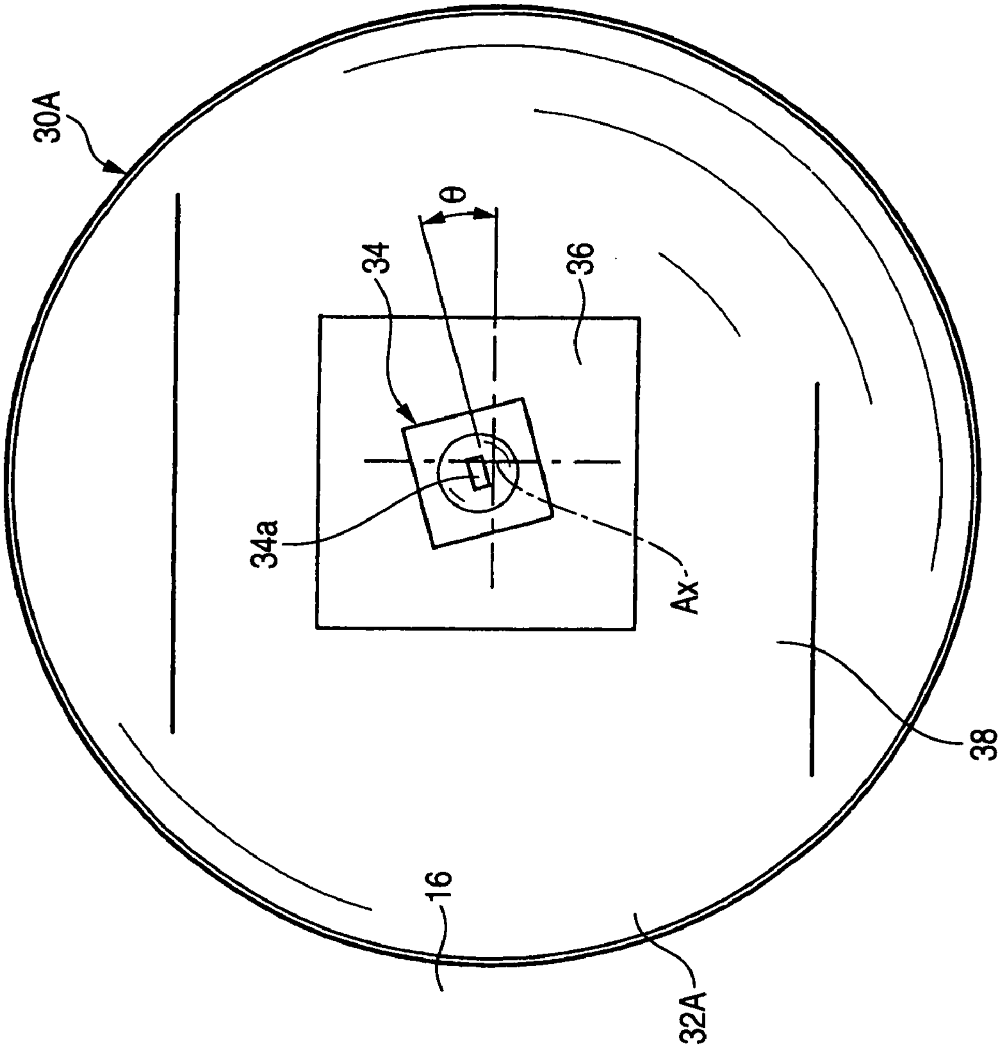
FIG. 5 is a detailed view seen in the V direction of FIG. 4 according to the exemplary, non-limiting embodiment of the present invention.

FIG. 4 is a sectional view taken along the IV—IV line in FIG. 1 and FIG. 5 is a detailed view seen in a V direction of FIG. 4. The five second lighting units 30A and 30B positioned in the middle stage include second projection lenses 32A and 32B provided on the optical axis Ax extended in the longitudinal direction of a vehicle, a second light source 34 formed by a light emitting diode provided to face forward in the vicinity of a focal point position on the rear side of the second projection lenses 32A and 32B, and a board 36 to which the second light source 34 is attached. The second lighting units 30A and 30B project the image of the second light source 34 as an inverted image forward from the lighting units 30A and 30B by means of the second projection lenses 32A and 32B.

These second lighting units 30A and 30B have the second projection lenses 32A and 32B supported on the unit holder 16, and have the second light source 34 supported on a common holder plate 38 through the board 36. The holder plate 38 is formed to be extended like a band in a transverse direction and is supported on the unit holder 16 at a peripheral edge portion thereof.

The second projection lenses 32A and 32B of the second lighting units 30A and 30B are constituted by a plano-convex lens having a front side surface to be convex and a rear side surface to be flat. In that case, a focal length f2*a* of the second projection lens 32A is set to have a comparatively great value in the two second lighting units 30A and a focal length f2*b* of the second projection lens 32B is set to have a comparatively small value in the three residual second lighting units 30B. The second light sources 34 of the second lighting units 30A and 30B are provided in slightly shifted positions from the optical axis Ax over a focal plane at the rear side of the second projection lenses 32A and 32B.

In FIG. 5 showing one of the second lighting units 30A, the second light source 34 of each of the second lighting units 30A and 30B has a rectangular light emitting chip 34*a* and both upper and lower sides of the light emitting chip 34*a* are provided to be extended in an inclined direction at a predetermined angle θ (for example, θ=approximately 15 degrees, but not limited thereto) to the horizontal direction. The specific shape of the light emitting chip 34*a* is set to be a rectangle that is extended to be relatively long in the inclined direction.

In the second lighting unit 30A shown in FIG. 5, the second light source 34 is provided in a position shifted leftward and upward from the optical axis Ax as seen from the front of the lighting unit 30A. The second light sources 34 of the residual second lighting units 30A and 30B are provided in positions shifted upward from the optical axis Ax, and the amount of the shift in the inclined direction is set to have a different value for each of the second lighting units 30A and 30B. Consequently, a light irradiated from each of the second lighting units 30A and 30B is set to be a slightly downward parallel light. Furthermore, the direction of the irradiated light is delicately varied between the second lighting units 30A and 30B in the inclined direction.

Figure 6:
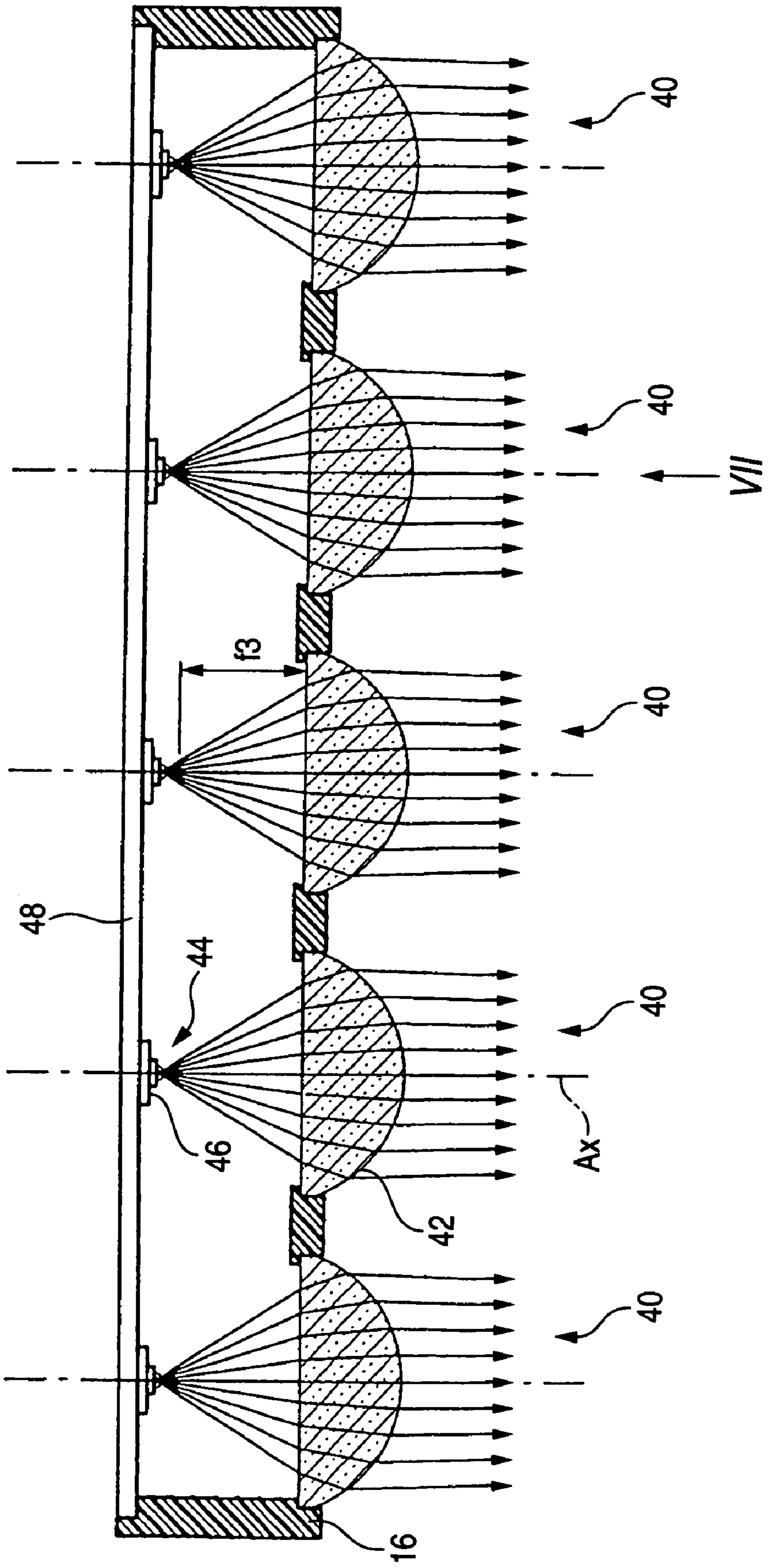
FIG. 6 is a sectional view taken along the VI—VI line in FIG. 1 according to the exemplary, non-limiting embodiment of the present invention.
Figure 7:
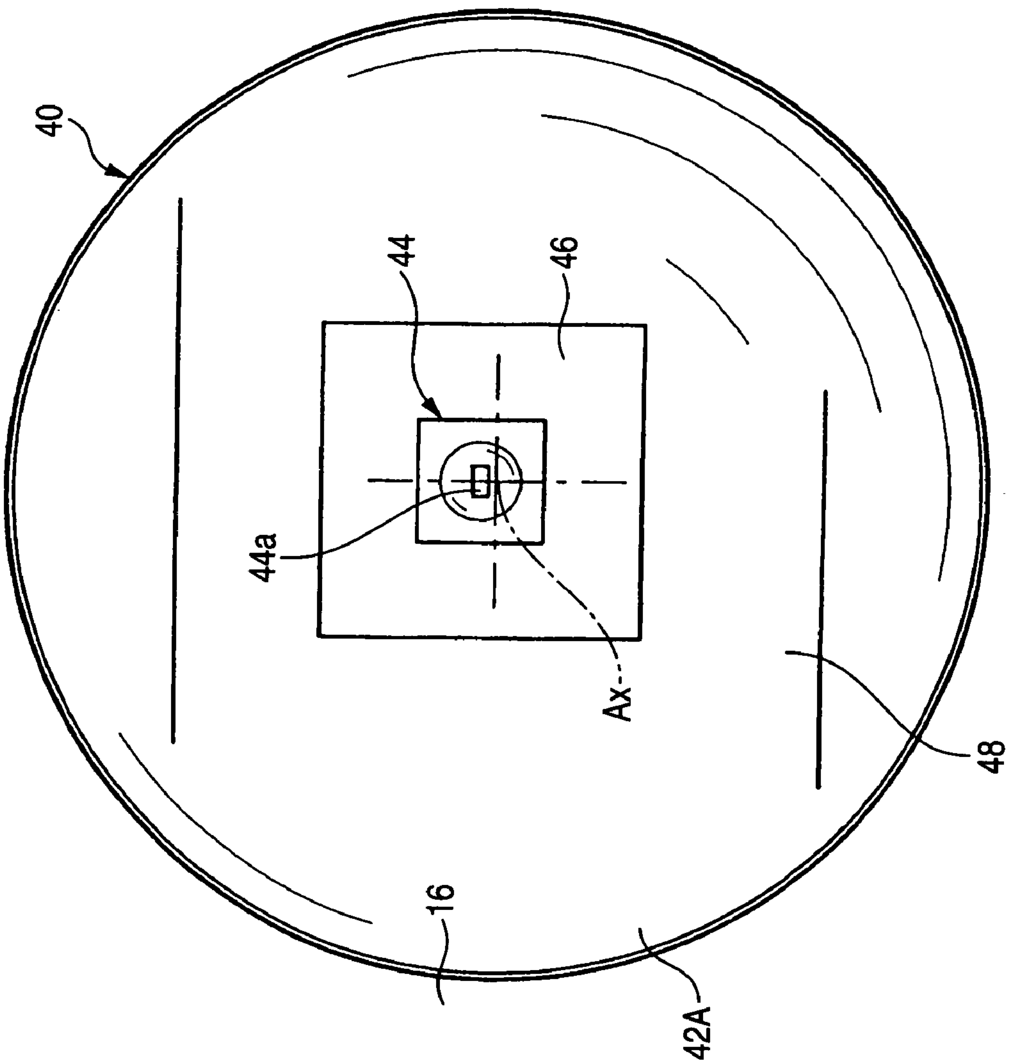
FIG. 7 is a detailed view seen in the VII direction of FIG. 6 according to the exemplary, non-limiting embodiment of the present invention.

FIG. 6 is a sectional view taken along a VI—VI line in FIG. 1 and FIG. 7 is a detailed view seen in a VII direction of FIG. 6. The five third lighting units 40 positioned in the upper stage include a third projection lens 42 provided on the optical axis Ax extended in the longitudinal direction of a vehicle, a third light source 44 formed by a light emitting diode position on the rear side of the third projection lens 42, and a board 46 to which the third light source 44 is attached. Each of the third lighting units 40 projects the image of the third light source 44 as an inverted image forward from the lighting unit 40 by means of the third projection lens 42.

These third lighting units 40 have the third projection lenses 42 supported on the unit holder 16, and have the third light sources 44 supported on a common holder plate 48 through the board 46. The holder plate 48 is extended like a band in a transverse direction and is supported on the unit holder 16 at a peripheral edge portion thereof.

The third projection lens 42 of the third lighting units 40 is constituted by a plano-convex lens having a convex front side surface and a flat rear side surface. A focal length f3 is set to have a comparatively small value. The third light source 44 of each of the third lighting units 40 is provided in a slightly rearward shifted position from a focal point position on the rear side of the third projection lens 42.

In FIG. 7 showing one of the third lighting units 40, the third light source 44 of each of the third lighting units 40 has a rectangular light emitting chip 44*a* and both upper and lower sides of the light emitting chip 44*a* are extended in the horizontal direction. The specific shape of the light emitting chip 44*a* is set to be a rectangle that is extended to be relatively long in the horizontal direction.

The third light source 44 of the third lighting unit 40 shown in FIG. 7 is provided in a position shifted just upward from the optical axis Ax as seen from the front of the lighting unit 40. The third light sources 44 of the residual third lighting units 40 are also provided in the same manner. Consequently, a light irradiated from each of the third lighting units 40 is set to be an almost parallel light merely converging slightly downward.

As described above and shown in FIG. 1, a plurality of diffusing lens units 14*s* is formed in the upper region of the translucent cover 14. Therefore, a light irradiated forward from the third light source 44 through the third projection lens 42 is diffused in the horizontal direction by means of the diffusing lens units 14*s*.

Figure 8:
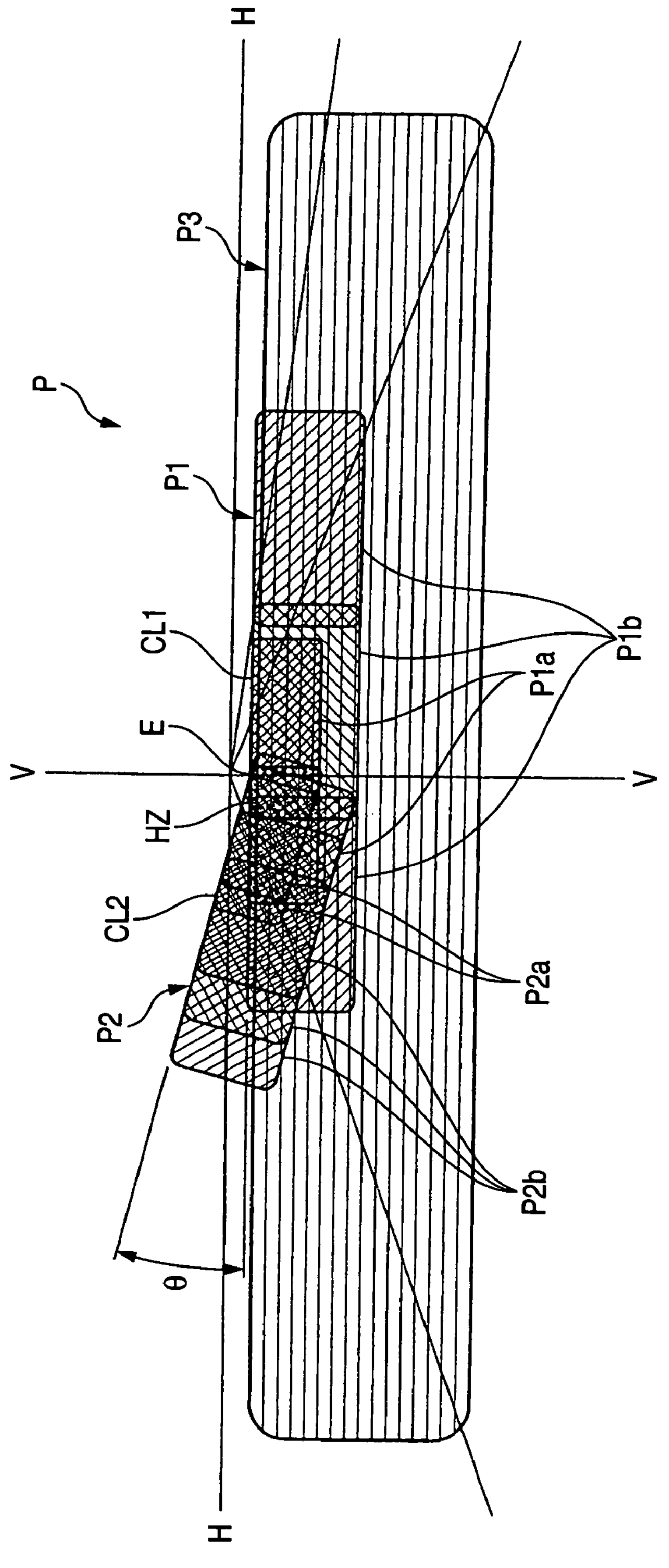
FIG. 8 is a perspective view showing a light distribution pattern formed on a virtual vertical screen provided in a forward position of 25 m from a light irradiated forward from the headlamp for a vehicle according to the exemplary, non-limiting embodiment of the present invention.

FIG. 8 is a perspective view showing a light distribution pattern P formed on a virtual vertical screen provided in a forward position of 25 m from the lighting unit by a light irradiated forward from the headlamp 10 for a vehicle according to the embodiment.

The light distribution pattern P is a light distribution pattern for a low beam to give a left light distribution which has horizontal and oblique cutoff lines CL1 and CL2 on an upper end thereof, and the position of an elbow point E to be the intersection of both of the cutoff lines is set below at approximately 0.5 to 0.6 degree of H–V to be a vanishing point in the front direction of the lighting unit. In the light distribution pattern P for a low beam, a hot zone HZ to be a region having a high luminous intensity is formed to surround the elbow point E slightly close to left.

The light distribution pattern P for a low beam is formed as a synthetic light distribution pattern of a pattern P1 for forming a horizontal cutoff line, a pattern P2 for forming an oblique cutoff line, and a pattern P3 for forming a diffusing region.

The pattern P1 for forming a horizontal cutoff line forms the horizontal cutoff line CL1 and is formed as a synthetic light distribution pattern of two small light distribution patterns P1*a* formed by a light irradiation from the two first lighting units 20A and three large light distribution patterns P1*b* formed by a light irradiation from the three first lighting units 20B.

These light distribution patterns P1*a* and P1*b* are formed as the inverted images of the first light sources 24 of the first lighting units 20A and 20B. Therefore, a part of the horizontal cutoff line CL1 is formed by the lower side of the light emitting chip 24*a* of the first light source 24. Moreover, a position in which each of the light distribution patterns P1*a* and P1*b* is to be formed is set corresponding to the direction and amount of displacement from the optical axis Ax of each of the first light sources 24.

In that case, in the two light distribution patterns P1*a*, the focal length f1*a* of the first projection lens 22A of the first lighting unit 20A has a comparatively greater value. Consequently, they are formed as comparatively small and bright light distribution patterns. These two light distribution patterns P1*a* are formed across the elbow point E along the horizontal cutoff line CL1. Thus, the distant visibility of the road surface in the forward portion of the vehicle is sufficiently maintained.

On the other hand, in the three light distribution patterns P1*b*, the focal length f1*b* of the first projection lens 22B of the first lighting unit 20B is set to have a comparatively small value. Consequently, they are formed as comparatively large light distribution patterns. In that case, these three light distribution patterns P1*b* are formed to surround the two light distribution patterns P1*a* along the horizontal cutoff line CL1. Thus, a luminous intensity distribution on the road surface in the forward portion of the vehicle can be unified.

The pattern P2 for forming an oblique cutoff line serves to form the oblique cutoff line CL2 and is formed as a synthetic light distribution pattern of two small light distribution patterns P2*a* formed by a light irradiation from the two second lighting units 30A and three large light distribution patterns P2*b* formed by a light irradiation from the three second lighting units 30B.

These light distribution patterns P2*a* and P2*b* are formed as the inverted images of the second light sources 34 of the second lighting units 30A and 30B. Therefore, a part of the oblique cutoff line CL2 is formed by the lower side of the light emitting chip 34*a* of the second light source 34. Moreover, a position in which each of the light distribution patterns P2*a* and P2*b* is to be formed is set corresponding to the direction and amount of a displacement from the optical axis Ax of each of the second light sources 34.

In that case, in the two light distribution patterns P2*a*, the focal length f2*a* of the second projection lens 32A of the second lighting unit 30A is set to have a comparatively greater value. Consequently, they are formed as comparatively smaller and brighter light distribution patterns. In that case, these two light distribution patterns P2*a* are formed to mostly overlap with each other along the oblique cutoff line CL2 in the vicinity of the elbow point E. Consequently, the hot zone HZ is formed to maintain the distant visibility of the road surface in the forward portion of the vehicle.

On the other hand, in the three light distribution patterns P2*b*, the focal length f2*b* of the second projection lens 32B of the second lighting unit 30B is set to have a comparatively smaller value. Consequently, they are formed as comparatively larger light distribution patterns. In that case, these three light distribution patterns P2*b* are formed to partially overlap with the two light distribution patterns P2*a* along the oblique cutoff line CL2 and to be slightly shifted between the light distribution patterns P2*b*. Consequently, the brightness of the hot zone HZ can be increased and the luminous intensity distribution on the road surface in the forward portion of the vehicle can be unified.

The pattern P3 for forming a diffusing region serves to form the diffusing region of the light distribution pattern P and is formed as a much larger light distribution pattern than the pattern P1 for forming a cutoff line under the horizontal cutoff line CL1.

The pattern P3 for forming a diffusing region is formed by diffusing a light irradiated from a light from the third light source 44 which is forward irradiated through the third projection lens 42 in each of the five third lighting units 40 in a horizontal direction through a plurality of diffusing lens units 14*s* formed in the upper region of the translucent cover 14.

In that case, in each of the third lighting units 40, the focal length f3 of the third projection lens 42 is set to have a comparatively smaller value and the third light source 44 is positioned behind a focal point position on the rear side of the third projection lens 42. Consequently, an inverted image is larger and a contour is slightly blurred. Since the inverted image is diffused in the horizontal direction by means of the diffusing lens units 14*s*, the pattern P3 for forming a diffusing region rarely has light unevenness. Consequently, light is uniformly irradiated on the road surface in the forward portion of the vehicle over a wide range.

As described above in detail, the headlamp 10 for a vehicle according to the embodiment is constituted to form the light distribution pattern P for a low beam having the horizontal cutoff line CL1 on the upper end and comprises the five first lighting units 20A and 20B for carrying out a light irradiation to form the horizontal cutoff line CL1, and each of the first lighting units 20A and 20B includes the first light source 24 formed by the light emitting diode having the rectangular light emitting chip 24*a* and provided to face forward in such a manner that one side of the light emitting chip 24*a* is extended in the horizontal direction, and the first projection lenses 22A and 22B provided in front of the first light source 24 and serving to project the image of the first light source 24 as an inverted image forward from the lighting unit.

As a result, it is possible to obtain at least the following functions and advantages. For example but not by way of limitation, each of the first light sources 24 is provided to face forward such that one side of the light emitting chip 24*a* extends in the horizontal direction. Therefore, the inverted image of the first light source 24 projected onto the virtual vertical screen provided in front of the lighting unit through the first projection lenses 22A and 22B becomes an almost rectangular image having an upper edge extending almost horizontally.

Since the almost rectangular inverted images are disposed with a proper shift from each other in the horizontal direction to form the horizontal cutoff line CL1, the clear horizontal cutoff line CL1 can be obtained. Consequently, it is possible to effectively suppress generation of glare.

In that case, the focal length f1*a* of each of the two first projection lenses 22A and the focal length f1*b* of each of the three first projection lenses 22B can be set to have different values from each other. Therefore, the inverted image of each of the first light sources 24 can be formed in two kinds of sizes. Consequently, the distant visibility of the road surface in the forward portion of the vehicle can be sufficiently maintained, and furthermore, the luminous intensity distribution of the light distribution pattern P for a low beam in the vicinity of the horizontal cutoff line CL1 can be unified.

In the exemplary, non-limiting embodiment, five second lighting units 30A and 30B carry out the light irradiation to form the oblique cutoff line CL2 which rises from the horizontal cutoff line CL1 at the predetermined angle θ. Each of the second lighting units 30A and 30B includes the second light source 34 formed by the light emitting diode having the rectangular light emitting chip 34*a* and provided to face forward in such a manner that one side of the light emitting chip 34*a* is extended in the inclined direction at the predetermined angle θ with respect to the horizontal direction, and the second projection lenses 32A and 32B provided in front of the second light source 34 and serving to project the image of the second light source 34 as an inverted image forward from the lighting unit. Therefore, it is possible to obtain at least the following functions and advantages.

For example but not by way of limitation, each of the second light sources 34 is provided to face forward in such a manner that one side of the light emitting chip 34*a* is extended in the inclined direction at the predetermined angle θ with respect to the horizontal direction. Therefore, the inverted image of the second light source 34 which is projected onto the virtual vertical screen provided in front of the lighting unit through the second projection lenses 32A and 32B becomes an almost rectangular image having an upper edge extended in the inclined direction. Since the almost rectangular inverted images are disposed with a proper shift from each other in the inclined direction to form the oblique cutoff line CL2, the clear oblique cutoff line CL2 can be obtained. Consequently, it is possible to effectively suppress the generation of glare.

In that case, the focal length f2*a* of each of the second projection lenses 32A and the focal length f2*b* of each of the second projection lenses 32B can be set to have different values from each other. Therefore, the inverted image of each of the second light sources 34 can be formed in two kinds of sizes. Consequently, the brightness of the hot zone HZ can be sufficiently maintained. Furthermore, the luminous intensity distribution of the light distribution pattern P for a low beam in the vicinity of the oblique cutoff line CL2 can be unified.

According to the exemplary, non-limiting embodiment, it is possible to finely control the shape and luminous intensity distribution of the light distribution pattern P for a low beam.

In addition, in the exemplary, non-limiting embodiment, the light sources of the first lighting units 20A and 20B, the second lighting units 30A and 30B and the third lighting unit 40 which constitute the headlamp 10 for a vehicle are formed by the light emitting diodes. Therefore, the size of each of the lighting units can be reduced. Consequently, the degree of freedom of the shape of the headlamp 10 for a vehicle can be enhanced. Furthermore, a size thereof can be reduced.

In the exemplary, non-limiting embodiment, particularly, since the shape of the light emitting chip 24*a* of the first light source 24 is set to be a rectangle that is extended to be relatively long in the horizontal direction, an inverted image thereof can also be projected as an oblong image.

Consequently, the first lighting units 20A and 20B can be much more suitable for the formation of the horizontal cutoff line CL1. Since the shape of the light emitting chip 34*a* of the second light source 34 is set to be a rectangle that is extended to be relatively long in the inclined direction, similarly, an inverted image thereof can also be projected as a long image in the inclined direction. Consequently, the second lighting units is more suitable for the formation of the oblique cutoff line CL2.

In the exemplary, non-limiting embodiment, light irradiated from a light from the third light source 44 which is irradiated forward through the third projection lens 42 is diffused in the horizontal direction by means of a plurality of diffusing lens units 14*s* formed in the upper region of the translucent cover 14, thereby forming the pattern P3 for forming a diffusing region in the five third lighting units 40. Consequently, the luminous intensity distribution of the light distribution pattern P for a low beam in the diffusing region can be unified.

In addition, in the exemplary, non-limiting embodiment, the first light sources 24 of the first lighting units 20A and 20B are displaced from the optical axis Ax over the focal plane on the rear side of the first projection lenses 22A and 22B, thereby setting the position in which each of the light distribution patterns P1*a* and P1*b* is to be formed. Consequently, the position in which each of the light distribution patterns P1*a* and P1*b* is to be formed can be set easily with high precision. Similarly, the second light sources 34 of the second lighting units 30A and 30B are displaced from the optical axis Ax over the focal plane on the rear side of the second projection lenses 32A and 32B, thereby setting the position in which each of the light distribution patterns P2*a* and P2*b* is to be formed. Consequently, the position in which each of the light distribution patterns P2*a* and P2*b* is to be formed can be set easily with high precision.

In that case, in the five first lighting units 20A and 20B, the first light sources 24 are supported on the common holder plate 28 through the board 26. Therefore, the direction and amount of the displacement of the first light source 24 from the optical axis Ax can be set with high precision. In the five second lighting units 30A and 30B, similarly, the second light sources 34 are supported on the common holder plate 38 through the board 36. Therefore, the direction and amount of the displacement of the second light source 34 from the optical axis Ax can be set with high precision.

By inclining the optical axes Ax of the first lighting units 20A and 20B to the longitudinal direction of the vehicle, instead, it is also possible to have such a structure as to set the position in which each of the light distribution patterns P1*a* and P1*b* is to be formed. By inclining the optical axes Ax of the second lighting units 30A and 30B to the longitudinal direction of the vehicle, it is also possible to have such a structure as to set the position in which each of the light distribution patterns P2*a* and P2*b* is to be formed.

Moreover, it is also possible to provide the first light sources 24 of the first lighting units 20A and 20B to be shifted in only the horizontal direction with respect to the optical axis Ax and to provide them on the optical axis Ax with respect to the vertical direction. In such a case, if the optical axes Ax of the first lighting units 20A and 20B are inclined slightly downward with respect to the longitudinal direction of the vehicle, it is possible to set, into a predetermined position, the position in which each of the light distribution patterns P1*a* and P1*b* is to be formed. Each of the second lighting units 30A and 30B can also be provided in the same manner.

While the five first lighting units 20A and 20B include the two types of first projection lenses 22A and 22B having different focal lengths, it is also possible to employ such a structure that the first projection lenses having equal focal lengths are provided. Alternatively, it is also possible to employ such a structure that at least three types of first projection lenses having different focal lengths are provided. In such a case, the luminous intensity distribution of the pattern P1 for forming a horizontal cutoff line can be further unified. While the five second lighting units 30A and 30B include the two types of second projection lenses 32A and 32B having different focal lengths, similarly, it is also possible to employ such a structure that the second projection lenses having equal focal lengths are provided. Alternatively, it is also possible to employ such a structure that at least three types of second projection lenses having different focal lengths are provided. In such a case, the luminous intensity distribution of the pattern P2 for forming an oblique cutoff line can be unified still more.

Moreover, it is also possible to form a plurality of diffusing lens units for diffusing the lights irradiated from the first lighting units 20A and 20B in the horizontal direction in the forward regions of the translucent cover 14 from the five first lighting units 20A and 20B. Thus, the luminous intensity distribution of the pattern P1 for forming a horizontal cutoff line can be unified still more. Similarly, it is also possible to form a plurality of diffusing lens units for diffusing the lights irradiated from the second lighting units 30A and 30B in the inclined direction in the forward regions of the translucent cover 14 from the five second lighting units 30A and 30B. Thus, the luminous intensity distribution of the pattern P2 for forming an oblique cutoff line can be further unified.

While the description has been given on the assumption that the five first lighting units 20A and 20B, the five second lighting units 30A and 30B and the five third lighting units 40 are provided in the three upper and lower stages in the embodiment, it is a matter of course that the number and arrangement of the lighting units may be properly changed corresponding to the shape and luminous intensity distribution of a light distribution pattern to be intended.

In the exemplary, non-limiting embodiment, the first projection lenses 22A and 22B of the first lighting units 20A and 20B can also be constituted integrally with the first light source 24 to seal the light emitting chip 24*a* of the first light source 24.

In such a case, the first lighting units 20A and 20B can have a simpler structure as the light source units. Moreover, an air layer can be prevented from being provided between the first light source 24 and the first projection lenses 22A and 22B. Consequently, an interfacial reflection can be eliminated. Thus, the luminous flux of the light source can be utilized effectively. In such a case, furthermore, it is also possible to omit the holder plate 28. Consequently, the structure of the headlamp for a vehicle can be simplified still more.

Referring to the second lighting units 30A and 30B, similarly, the second projection lenses 32A and 32B can be constituted integrally with the second light source 34 in order to seal the light emitting chip 34*a* of the second light source 34. Referring to the third lighting unit 40, the third projection lens 42 can be constituted integrally with the third light source 44 in order to seal the light emitting chip 44*a* of the third light source 44.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

I claim:

1. A headlamp for a vehicle, which forms a light distribution pattern having a horizontal cutoff line on an upper end, comprising a plurality of first light irradiation units that form the horizontal cutoff line by light, each of the first light irradiation units comprising:

a first light source formed by a first semiconductor light emitting unit having a first substantially rectangular light emitting chip and facing forward such that one side of the first light emitting chip extends in a horizontal direction; and a first projection lens located in front of the first light source and serving to project an image of the first light source as an inverted image forward from the respective first light irradiation units, wherein a center of the first substantially rectangular light emitting chip is shifted away from an optical axis of the first projection lens.

2. The headlamp according to claim 1, wherein the first substantially rectangular light emitting chip of the first light source is relatively long in a horizontal direction.

3. The headlamp according to claim 1, further comprising a plurality of second light irradiation units that form an oblique cutoff line that rises from the horizontal cutoff line at an angle, each of the second light irradiation units comprising:

a second light source formed by a second semiconductor light emitting unit having a second substantially rectangular light emitting chip and facing forward such that one side of the second light emitting chip extends in an inclined direction at the angle with respect to the horizontal direction; and a second projection lens positioned in front of the second light source and serving to project an image of the second light source as an inverted image forward from the respective second light irradiation units.

4. The headlamp according to claim 3, wherein a shape of the second light emitting chip of the second light source is substantially rectangular and extends relatively long in the inclined direction at the angle.

5. The headlamp according to claim 1, wherein the optical axis of the first projection lens does not pass through the first substantially rectangular light emitting chip.

6. The headlamp according to claim 1, wherein the first projection lens is piano-convex.

7. A headlamp which forms, on an upper end, a light distribution pattern having an oblique cutoff line extended at an angle with respect to a horizontal direction, comprising a plurality of light irradiation units that form the oblique cutoff line, each of the light irradiation units comprising:

a light source formed by a semiconductor light emitting unit having a substantially rectangular light emitting chip and provided to face forward such that one side of the light emitting chip is extended in an inclined direction at the angle with respect to the horizontal direction; and a projection lens positioned in front of the light source and serving to project an image of the light source as an inverted image forward from the respective light irradiation units, wherein a center of the substantially rectangular light emitting chip is shifted away from an optical axis of the projection lens.

8. A headlamp for forming a light distribution pattern, comprising a first lighting system comprising:

at least one first light emitting unit that is substantially rectangular and faces forward; and at least one corresponding first projection lens that projects an image of light generated by said at least one first light emitting unit, wherein:

a center of the at least one first light emitting unit is shifted away from an optical axis of the at least one corresponding first projection lens; and said image is substantially inverted.

9. The headlamp of claim 8, further comprising a plurality of said at least one first light emitting units and a plurality of said at least one corresponding first projection lenses, wherein:

a first one of the at least one first light emitting units has a first focal length with respect to a first one of the at least one corresponding first corresponding projection lens lenses; and a second type one of the at least one first light emitting unit having units has a second focal length with respect to a second one of the at least one corresponding first projection lenses; and said first focal length is greater than said second focal length.

10. The headlamp of claim 8, further comprising a lens cover that is translucent.

11. The headlamp of claim 8 wherein said at least one first light emitting unit is at least one of (a) inclined at an angle with respect to a horizontal direction; or (b) positioned to one side and upward from said optical axis.

12. The headlamp of claim 11, wherein said angle is about 15degrees.

13. The headlamp of claim 8, further comprising a second lighting system comprising:

at least one second light emitting unit that is substantially rectangular and faces forward; and at least one second corresponding projection lens that projects substantially inverted light generated by said at least one second light emitting unit, wherein a center of the at least one second light emitting unit is shifted upward from an optical axis of the at least one second corresponding projection lens.

14. The headlamp of claim 13, further comprising a lens cover having a plurality of vertically striped diffusing lens units adjacent to the at least one corresponding second projection lens of said second light system.

15. The headlamp of claim 13, wherein said first lighting system is positioned below said second lighting system in said headlamp.

16. The headlamp of claim 13, further comprising a third lighting system comprising:

at least one third light emitting unit that is substantially rectangular and faces forward; and at least one corresponding third projection lens that projects substantially inverted light generated by said at least one third light emitting unit, wherein:

a center of the at least one third light emitting unit is shifted upward and to one side of an optical axis of the at least one corresponding third projection lens; and said at least one first light emitting unit of said first lighting system is inclined at an angle with respect to a horizontal direction.

17. The headlamp of claim 16, wherein said third lighting system is vertically positioned below the first lighting system, which is positioned below the second lighting system.

18. The headlamp of claim 16, wherein said angle is about 15 degrees.

19. The headlamp of claim 16, further comprising a plurality of each of said at least one first, second and third light emitting units and a plurality of said at least one corresponding first, second and third projection lenses, wherein:

a first one of the at least one first light emitting units has a first focal length with respect to a first one of the at least one corresponding first projection lenses;

a second one of the at least one first light emitting units has a second focal length with respect to a second one of the at least one corresponding first projection lenses;

a first one of the at least one second light emitting units has a third focal length with respect to a first one of the at least one corresponding second projection lenses;

a second type one of the at least one second light emitting unit in said second lighting system having units has a fourth focal length with respect to a second one of the at least one corresponding second projection lens lenses; and a first one of the at least one third light emitting units has a fifth focal length with respect to a first one of the at least one corresponding third projection lenses, wherein said first focal length is greater than said second focal length, said third focal length is greater than said fourth focal length, and said fifth focal length is less than any of said first through fourth focal lengths.

* * * * *